United States Patent Office 3,423,114
Patented Jan. 21, 1969

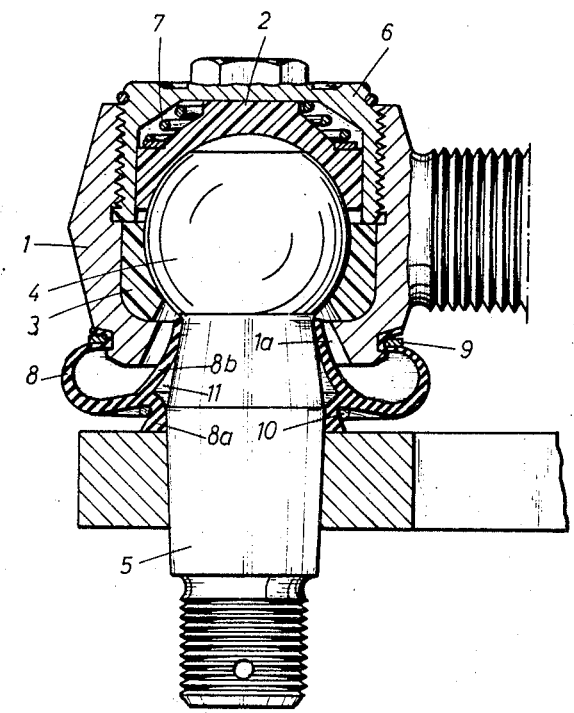

3,423,114
SEALING BELLOWS FOR BALL JOINTS
Rudolf Gottschald, Osterath, Germany, assignor to
A. Ehrenreich & Cie., Dusseldorf-Oberkassel,
Germany
Filed Dec. 12, 1966, Ser. No. 600,844
U.S. Cl. 287—87　　2 Claims
Int. Cl. F16c 11/08

ABSTRACT OF THE DISCLOSURE

A ball joint which includes a bellows having its outer marginal portion firmly connected to the ball joint housing and having its inner marginal portion clamped to the ball stud while flexible cuff portion integral with said bellows tapers from an area slightly radially outwardly from said inner marginal portion in the direction toward said ball head and resiliently and sealingly engaging said stud closely adjacent said ball head.

---

The present invention relates to a sealing bellows of elastic material for a ball joint housing and a ball stud having its ball head journalled in said housing, while the sealing bellows of bead-shaped cross section is connected on one hand to the housing and on the other hand under load engages the ball stud. Ball joints of this type may be employed for instance in motor vehicles.

Arrangements of this type have become known according to which the sealing bellows between the joint housing and the ball stud is clamped on one hand between the joint housing and a bearing cup surrounding the ball head, and on the other hand is by means of a clamping ring or the like clamped onto the ball stud. Such heretofore known sealing bellows has the drawback that it is relatively stiff with regard to bending and does not closely engage the ball stud.

It is, therefore, an object of the present invention to overcome the above mentioned drawback.

It is a further object of this invention to provide a sealing bellows for ball joints according to which the seal between the joint housing and the ball stud of a ball joint will be more elastic.

These and other objects and advantages of the invention will appear more clearly from the following specification in connection with the accompanying drawing illustrating a cross section through a ball joint with a sealing bellows according to the invention.

The invention is based on a sealing bellows of bead-shaped cross section which on one hand is connected to the joint housing and on the other hand under load engages the ball stud by means of a flange. The present invention is characterized primarily by a funnel-shaped sleeve the outer end of which is bent inwardly and connected to the housing while the other free end flexibly and sealingly engages the ball stud closely adjacent to said ball head. According to a further development of the invention, said sleeve together with said flange and together with the ball stud may define a grease chamber.

The shape of the sealing bellows according to the invention makes the seal more elastic while at the same time affording the possibility to create a grease storage chamber by means of which the frictional resistance between the sealing bellows and the ball stud will be reduced and the seal between both parts will be improved.

Referring now to the drawing in detail, the ball joint illustrated therein comprises a housing 1 open at the top and provided with an opening or passage 1a at the bottom. Inserted into the joint housing 1 are two bearing cups 2, 3 for instance of a hard synthetic material, such as neoprene or interlinked polyurethane. The said bearing cups 2, 3 surround the ball head 4 of a ball stud 5. The upper opening of housing 1 is closed by a housing cover 6 adapted to be screwed into said housing. The lower marginal portion of cover 6 rests on the lower bearing cup 3. If desired, a pressure spring 7 may be inserted between the housing cover 6 and the upper bearing cup 2. This spring 7 elastically presses the upper bearing cup 2 onto the ball head 4.

For purposes of sealing the lower passage 1a of the joint housing 1, there is provided a bead-shaped sealing bellows 8 the lower end of which has a connecting flange 8a. The sealing bellows 8 furthermore comprises a funnel-shaped sleeve or cuff 8b. Bellows 8 may on one hand by means of a clamping ring 9 be connected to the lower end of housing 1 and on the other hand may by means of a clamping ring 10 have its connecting flange 8a pressed against the ball stud 5.

The funnel-shaped sleeve 8b connected to the inner portion of the sealing bellows 8 loosely engages the ball stud 5 by means of its free end and, more specifically, adjacent passage 1a in the bottom portion of housing 1. Between the funnel-shaped sleeve 8b and the connecting flange 8a there is formed a grease chamber 11 which is filled with grease when the ball joint is assembled. The grease filled into the chamber 11 will on one hand bring about a better seal of the ball joint and on the other hand will simultaneously reduce the frictional resistance between the ball stud 5 and the connecting flange 8a of the sealing bellows 8.

It is, of course, to be understood that the present invention is, by no means, limited to the particular construction shown in the drawing but also comprises any modifications within the scope of the appended claims.

What I claim is:
1. A ball joint which includes: a housing having a first opening at one end and having a second opening at a second end opposite said first end, closure means closing said first opening, socket means mounted in said housing, a ball stud having a ball head journalled in said socket means, said ball stud also having a shank portion connected to said ball head and extending through said second opening, and a bellows having a first marginal end portion connected to said housing and a second marginal end portion in the form of a flange for connection with said stud, clamping means clamping said flange to said stud, said bellows also having a radially outwardly bulging portion interconnecting said first marginal end portion and said flange, said bellows also comprising a flexible cuff portion integrally joined with said radially outwardly bulging portion axially beyond said clamping means and uniting therewith at the area where said radially outwardly bulging portion merges with said flange outside the area which is subjected to clamping stresses by said clamping means, said cuff portion tapering from said merging area in the direction toward and extending to adjacent said ball head while being slightly bowed inwardly along the length thereof so as to resiliently and sealingly engage said stud closely adjacent said ball head by its own resiliency only and devoid of clamping pressure by said clamping means.

2. A ball joint according to claim 1, in which said cuff portion together with said flange and the adjacent portion of said stud defines an annular chamber of substantially triangular cross section for receiving a lubricant.

References Cited

UNITED STATES PATENTS

| | | |
|---|---|---|
| 2,641,492 | 6/1953 | Flumerfelt. |
| 2,752,180 | 6/1956 | Vogt _____ 287—87 |
| 2,957,713 | 10/1960 | Herbenar. |
| 3,027,182 | 3/1962 | Reyter _____ 287—87 |
| 3,052,477 | 9/1962 | Parker. |
| 3,155,407 | 11/1964 | Gottschald _____ 287—87 |
| 3,166,333 | 11/1965 | Henley. |

FOREIGN PATENTS 620,686   3/1961   Italy.

CARL W. TOMLIN, *Primary Examiner.*

ANDREW KUNDRAT, *Assistant Examiner.*

U.S. Cl. X.R.

287—90